(12) United States Patent
Lobo et al.

(10) Patent No.: US 9,164,670 B2
(45) Date of Patent: Oct. 20, 2015

(54) FLEXIBLE TOUCH-BASED SCROLLING

(75) Inventors: Philomena Lobo, Redmond, WA (US); Yu-Xi Lim, Lynnwood, WA (US); Yang Xu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 582 days.

(21) Appl. No.: 12/882,906

(22) Filed: Sep. 15, 2010

(65) Prior Publication Data

US 2012/0062604 A1 Mar. 15, 2012

(51) Int. Cl.
G09G 5/34 (2006.01)
G06F 3/0485 (2013.01)
G06F 3/0488 (2013.01)

(52) U.S. Cl.
CPC .......... *G06F 3/0485* (2013.01); *G06F 3/04883* (2013.01)

(58) Field of Classification Search
USPC .................................................. 345/173, 661
See application file for complete search history.

(56) References Cited

U.S. PATENT DOCUMENTS

| | | | |
|---|---|---|---|
| 6,300,936 B1 * | 10/2001 | Braun et al. .................. | 345/156 |
| 8,433,109 B2 * | 4/2013 | Chou ........................... | 382/124 |
| 2002/0135602 A1 | 9/2002 | Davis et al. | |
| 2006/0055662 A1 | 3/2006 | Rimas-Ribikauskas | |
| 2006/0125799 A1 * | 6/2006 | Hillis et al. .................. | 345/173 |
| 2007/0226646 A1 * | 9/2007 | Nagiyama et al. ........... | 715/784 |
| 2008/0040692 A1 | 2/2008 | Sunday | |
| 2009/0058820 A1 | 3/2009 | Hinckley | |
| 2009/0128516 A1 * | 5/2009 | Rimon et al. ................. | 345/174 |
| 2010/0011316 A1 | 1/2010 | Sar et al. | |
| 2010/0013768 A1 * | 1/2010 | Leung .......................... | 345/163 |
| 2010/0017872 A1 * | 1/2010 | Goertz et al. ................ | 345/173 |
| 2010/0289743 A1 * | 11/2010 | Sun et al. ...................... | 345/158 |
| 2011/0074699 A1 * | 3/2011 | Marr et al. .................... | 345/173 |
| 2011/0102455 A1 * | 5/2011 | Temple ......................... | 345/619 |
| 2011/0115822 A1 * | 5/2011 | Bae ............................... | 345/661 |
| 2013/0120279 A1 * | 5/2013 | Plichta et al. ................ | 345/173 |

OTHER PUBLICATIONS

Kiriaty et al., "Introducing Windows® 7 for Developers," Microsoft Press, 417 pages, Nov. 11, 2009.
Aliakseyeu et al., "Multi-flick: An Evaluation of Flick-Based Scrolling Techniques for Pen Interfaces," *CHI 2008 Proceedings—Pointing and Flicking*, Apr. 5-10, 2008, Florence, Italy, 10 pages, Published Date: Apr. 10, 2008.

(Continued)

*Primary Examiner* — Phi Hoang
(74) *Attorney, Agent, or Firm* — Aneesh Mehta; Kate Drakos; Micky Minhas

(57) ABSTRACT

A flexible touch-based scrolling system receives user input comprising a gesture on a touchscreen. The system compares the gesture velocity with one or more velocity ranges. For example, the system determines whether the gesture velocity is above a threshold velocity or below a threshold velocity. The system selects between different types of movement (e.g., smooth scrolling movement, page-by-page movement) of the visual information in the user interface, based on the comparison of the gesture velocity with the velocity ranges. For example, the system selects smooth scrolling movement if the gesture velocity is below a threshold velocity, and the system selects page-by-page movement if the gesture velocity is above the threshold velocity.

20 Claims, 10 Drawing Sheets

(56) References Cited

OTHER PUBLICATIONS

Carter et al., "SeeReader: An (Almost) Eyes-Free Mobile Rich Document Viewer," *IJCSI International Journal of Computer Science Issues*, vol. 3, No. 1, 5 pages, Published Date: Aug. 27, 2009.

Audioholics Online A/V Magazine, "Apple iPhone Multi-touch Technology and Flick Scrolling," <http://www.audioholics.com/reviews/portables/apple-iphone-review/apple-iphone-multi-touch-technology-and-flick-scrolling.html>, 2 pages, Published Date: Jul. 3, 2007.

"Synaptics Gesture Suite™ for TouchPads," <http://www.synaptics.com/solutions/technology/gestures/touchpad>, 5 pages, Retrieved Date: Jun. 23, 2010.

* cited by examiner

Software 880 implementing described
techniques and tools

FLEXIBLE TOUCH-BASED SCROLLING

BACKGROUND

The design of an effective user interface poses many challenges. One challenge is how to provide a user with an optimal amount of visual information or functionality, given the space limitations of a display and the needs of a particular user. This challenge can be especially acute for devices with small displays, such as smartphones or other mobile computing devices, because there is often more information available to a user performing a particular activity (e.g., browsing for audio or video files in a library of files) than can fit on the display.

Although there have been a variety of advances in user interfaces, there remains room for improvement.

SUMMARY

Technologies described herein relate to presenting visual information in a user interface with flexible touch-based scrolling. For example, a flexible touch-based scrolling system receives user input comprising a gesture on a touchscreen. The system compares the gesture velocity with one or more velocity ranges. For example, the system determines whether the gesture velocity is above a threshold velocity or below a threshold velocity. The system selects between different types of movement (e.g., smooth scrolling movement, page-by-page movement) of the visual information in the user interface, based on the comparison of the gesture velocity with the velocity ranges. For example, the system selects smooth scrolling movement if the gesture velocity is below a threshold velocity, and the system selects page-by-page movement if the gesture velocity is above the threshold velocity.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary Overview

Technologies described herein relate to presenting visual information in a user interface with flexible touch-based scrolling. For example, a flexible touch-based scrolling system receives user input comprising a gesture on a touchscreen. The system compares the gesture velocity with one or more velocity ranges. For example, the system determines whether the gesture velocity is above a threshold velocity or below a threshold velocity. The system selects (e.g., switches) between different types of movement (e.g., smooth scrolling movement, page-by-page movement) of the visual information in the user interface, based on the comparison of the gesture velocity with the velocity ranges. For example, the system selects smooth scrolling movement if the gesture velocity is below a threshold velocity, and the system selects page-by-page movement if the gesture velocity is above the threshold velocity. Page-by-page movement in a touchscreen context can be used to duplicate the functionality of keyboard input such as input provided by "Page Up" or "Page Down" keys.

The technologies described herein can improve readability of content by, for example, helping users find a next page or a previous page when viewing content such as a news article on a web page. Scrolling systems can use scrolling movement that depends on factors such as the velocity of a flick gesture. The scrolling movement can vary based on the velocity of the flick, and potentially other factors such as simulated inertia. In some systems, it can be difficult to control scrolling movement, and users often must perform further gestures, scrolling back and forth to get to a desired page if the first gesture has caused the content to scroll too far or not far enough.

Example 2

Exemplary Content

The technologies described herein can be used to present content to a user. Any of the techniques and tools described herein can assist in presenting content in various formats, such as web pages, documents, and the like. Content can include visual information such as text, images, embedded video clips, animations, graphics, interactive visual content (e.g., buttons or other controls, clickable icons and hyperlinks, etc.), and the like. Content also can include non-visual information such as audio. Described techniques and tools that use scrolling movement to present visual information to users are beneficial, for example, when presenting visual information that cannot be displayed in a readable form all at once in a display area. This situation is commonly encountered when users employ devices with small display areas (e.g., smartphones) to view content (e.g., web pages) that is designed to be displayed on devices with a larger display area (e.g., desktop or laptop computers).

Example 3

Exemplary System Employing a Combination of the Technologies

Figure 1:
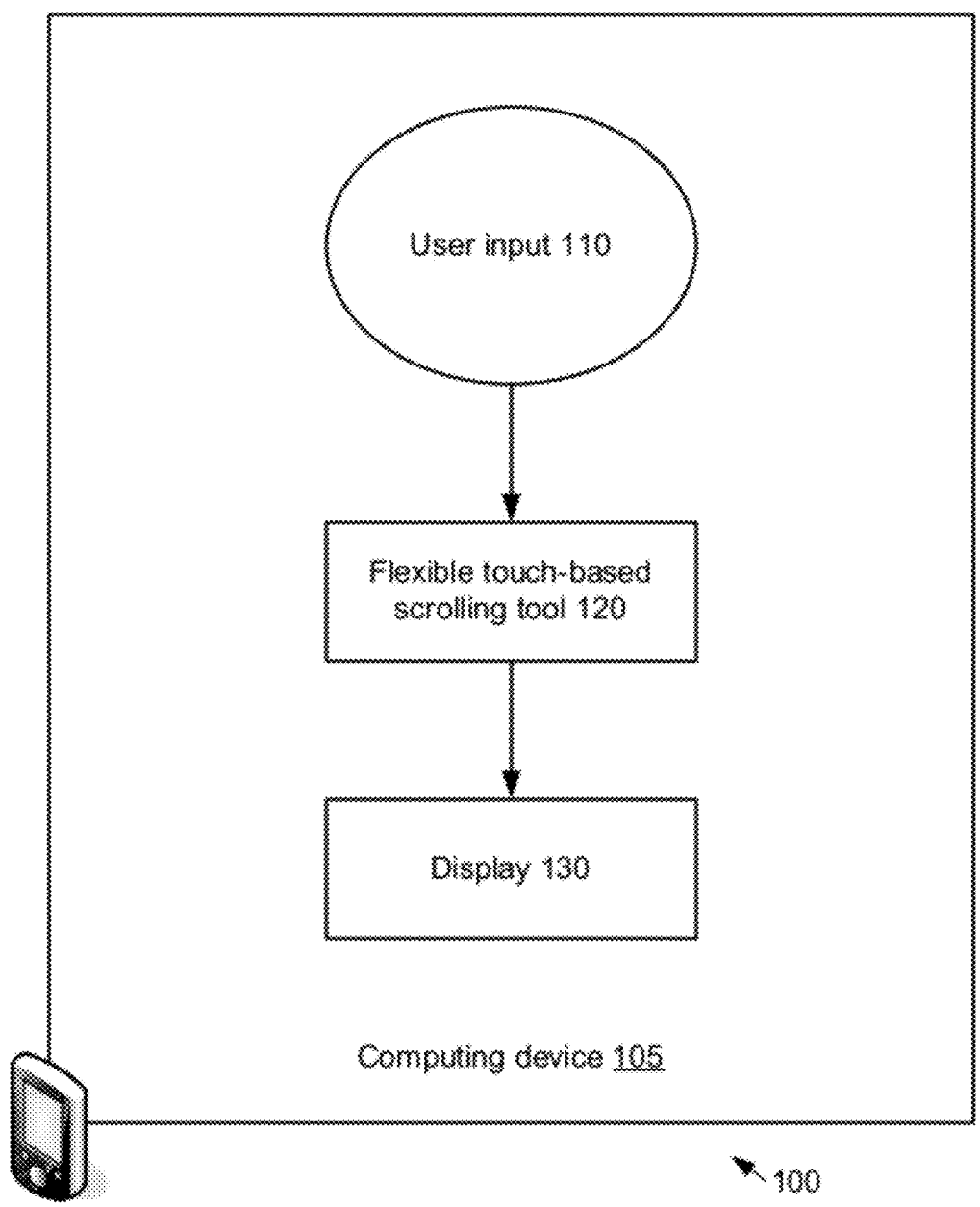
FIG. 1 is a block diagram of an exemplary system implementing the flexible touch-based scrolling technologies described herein.

FIG. 1 is a block diagram of an exemplary system 100 implementing the flexible touch-based scrolling technologies described herein. In the example, one or more computing devices 105 implement a flexible touch-based scrolling tool 120 that accepts user input 110 to initiate movement in content presented to the user on display 130. The flexible touch-based scrolling tool 120 can generate and render movements such as smooth scrolling movements and jump displacement movements (e.g., page-by-page movements, beginning-or-end movements, etc.).

In practice, the systems shown herein such as system 100 can be more complicated, with additional functionality, more complex relationships between system components, and the like. The technologies described herein can be generic to the specifics of operating systems or hardware and can be applied in any variety of environments to take advantage of the described features.

Example 4

Exemplary Jump Displacement Movement

In any of the examples described herein, a jump displacement movement can be used to navigate through content. Jump displacement movement refers to movement of visual information by a predetermined displacement that depends on whether the velocity of the gesture that initiated the movement falls within a particular velocity range. A jump displacement associated with a particular velocity range will be the same for gestures having different velocities within that range. Typically, jump displacement movement is in a direction that corresponds to the direction of the gesture. For example, an upward gesture can cause upward jump displacement movement (e.g., page-by-page movement) in the visual information, or a downward gesture can cause downward jump displacement movement in the visual information.

A velocity range for jump displacement movement can be, for example, a range between two positive numbers, or a range that extends from a positive number (e.g., a threshold velocity) to infinity. A velocity range for jump displacement movement also can include negative numbers, such as where a negative velocity is used to represent a gesture in the opposite direction of a gesture with a positive velocity. Jump displacement movement can be used in combination with smooth scrolling movement (which is described in detail in other examples herein) and/or other types of movement.

An example of a jump displacement movement is page-by-page scrolling movement, where a gesture having a gesture velocity that falls within a particular range causes visual information to move (e.g., in the direction of the gesture) by a displacement of a page. Another example of jump displacement movement is beginning-or-end movement, which involves moving visual information from a current position to a position at the end or beginning of content. In beginning-or-end movement, the jump displacement can be considered to be the difference between a current position and a position at the end or beginning of the visual information. Beginning-or-end movement can be used, for example, when a gesture velocity falls within a higher velocity range than a range associated with page-by-page movement. Page-by-page movement and beginning-or-end movement are described in further detail in other examples herein. A jump displacement can be of any magnitude (e.g., half of a page, multiple pages, multiple lines of text, multiple rows of images, etc.).

Described techniques and tools can use jump displacements of any size and/or gesture velocity ranges of any value or size, and can even use more than one jump displacement size and/or gesture velocity range in the same scrolling session. Although described as jump displacement movement, such movement need not be rendered as an abrupt transition in a display area. For example, a jump displacement movement can have a predetermined displacement that is determined based on a velocity that falls within a particular velocity range, but for a more natural feel, the movement itself can be rendered as a gradual scrolling movement that ends at the predetermined displacement.

Example 5

Exemplary Method of Applying a Combination of the Technologies

Figure 2:
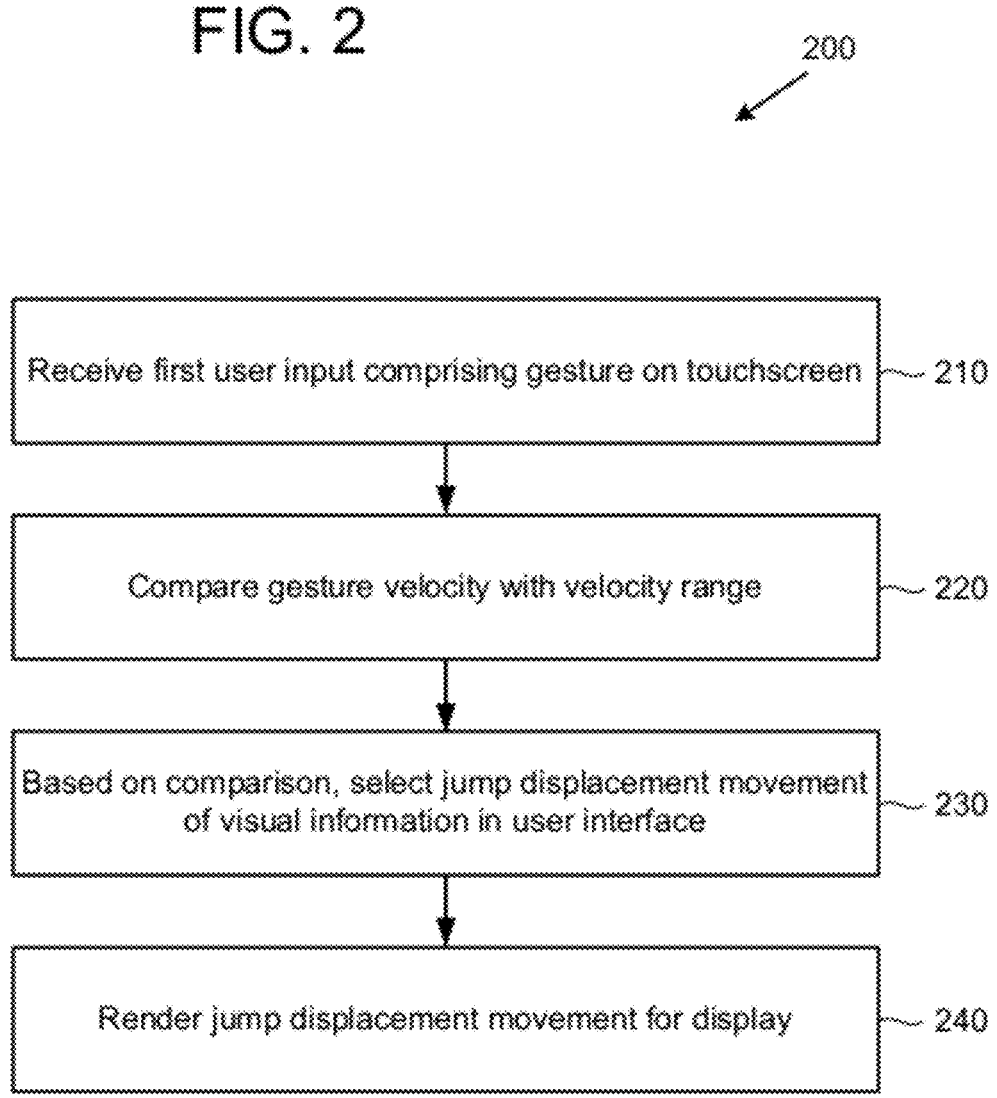
FIG. 2 is a flowchart of an exemplary method of implementing the flexible touch-based scrolling technologies described herein.

FIG. 2 is a flowchart of an exemplary method 200 of implementing the flexible touch-based scrolling technologies described herein and can be implemented, for example, in a system such as that shown in FIG. 1. The technologies described herein can be generic to the specifics of operating systems or hardware and can be applied in any variety of environments to take advantage of the described features.

At 210, the system receives user input comprising a gesture on a touchscreen. At 220, the system compares the gesture velocity with a velocity range. At 230, the system selects jump displacement movement of visual information (e.g., a web page, a document, contact list, etc.) in a user interface, based on the comparison of the gesture velocity with the velocity range. At 240, the system renders the jump displacement movement for display.

The method 200 and any of the methods described herein can be performed by computer-executable instructions stored in one or more computer-readable media (e.g., storage or other tangible media) or one or more computer-readable storage devices.

Example 6

Exemplary System Employing a Combination of the Technologies

Figure 3:
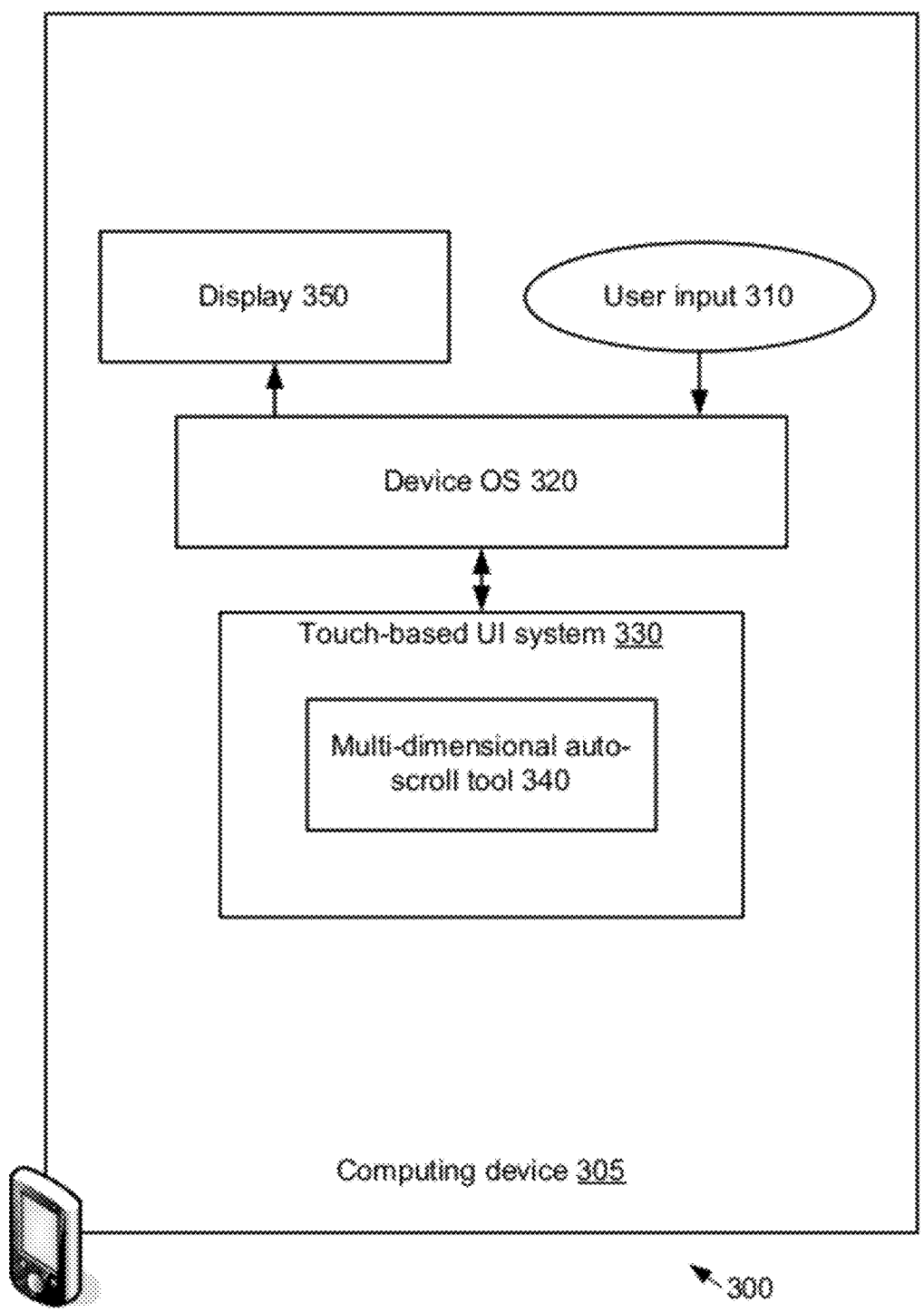
FIG. 3 is a block diagram of another exemplary system implementing the flexible touch-based scrolling technologies described herein.

FIG. 3 is a block diagram of another exemplary system 300 implementing the flexible touch-based scrolling technologies described herein. In the example, one or more computing devices 305 implement a flexible touch-based scrolling tool 320 that accepts user input 310 to initiate a scrolling movement in content presented to the user on display 350. The user input 310 can include touch-based user input, such as one or more gestures on a touchscreen. In the example, a device operating system (OS) receives touch-based user input information (e.g., gesture information such as velocity, direction, etc.), interprets it, and forwards the interpreted touch-based user input information to touch-based user interface (UI) system 330, which includes the flexible touch-based scrolling tool 320. The touch-based UI system 330, via the flexible touch-based scrolling tool 320, determines how flexible touch-based scrolling movement should be presented. The touch-based UI system forwards flexible touch-based scrolling information to the device OS 320, which sends rendering information to the display 350.

Example 7

Exemplary Gesture

In any of the examples herein, user input can include one or more gestures on a touchscreen. A touch-based user interface UI system such as system 330 in FIG. 3 can accept input from one or more contact points on a touchscreen and use the input to determine what kind of gesture has been made. For example, a touch-based UI system 330 can distinguish between different gestures on the touchscreen, such as drag gestures and flick gestures, based on gesture velocity. When a user touches the touchscreen and begins a movement while maintaining contact with the touchscreen, touch-based UI system 330 can continue to fire inputs while the user maintains contact with the touchscreen and continues moving. The position of the contact point can be updated, and the rate of movement (velocity) can be monitored. When the physical movement ends (e.g., when user breaks contact with the touchscreen), the system can determine whether to interpret the motion as a flick by determining how quickly the user's finger, stylus, etc., was moving when it broke contact with the touchscreen, and whether the rate of movement exceeds a threshold. The threshold velocity for a flick to be detected (i.e., to distinguish a flick gesture from a drag gesture) can vary depending on implementation.

In the case of a drag gesture, the system can move content in the amount of the drag (e.g., to give an impression of the content being moved directly by a user's finger). In the case of a flick gesture (e.g., where the user was moving more rapidly when the user broke contact with the touchscreen), the system can use simulated inertia to determine a post-gesture position for the content, allowing the content to continue to move after the gesture has ended. Although gestures such as drag and flick gestures are commonly used to cause movement of content in a display area, such gestures also can be accepted as input for other purposes without causing any direct movement of content.

A touch-based UI system also can detect a tap or touch gesture, such as where the user touches the touchscreen in a particular location, but does not move the finger, stylus, etc. before breaking contact with the touchscreen. As an alternative, some movement is permitted, within a small threshold, before breaking contact with the touchscreen in a tap or touch gesture. A touch-based system also can detect multi-touch gestures made with multiple contact points on the touchscreen.

Depending on implementation and/or user preferences, gesture direction can be interpreted in different ways. For example, a device can interpret any movement to the left or right, even diagonal movements extending well above or below the horizontal plane, as a valid leftward or rightward motion, or the system can require more precise movements. As another example, a device can interpret any upward or downward movement, even diagonal movements extending well to the right or left of the vertical plane, as a valid upward or downward motion, or the system can require more precise movements. As another example, upward/downward motion can be combined with left/right motion for diagonal movement effects. Multi-dimensional gestures (e.g., gestures involving a combination of movement in more than one dimension, such as horizontal motion followed by vertical motion) also can be used.

The actual amount and direction of the user's motion that is necessary to for a device to recognize the motion as a particular gesture can vary depending on implementation or user preferences. For example, a user can adjust a touchscreen sensitivity control, such that differently sized or shaped motions of a fingertip or stylus on a touchscreen will be interpreted as the same gesture to produce the same effect, or as different gestures to produce different effects, depending on the setting of the control.

The gestures described herein are only examples. In practice, any number of the gestures described herein or other gestures can be used when implementing the technologies described herein. Described techniques and tools can accommodate gestures of any size, velocity, or direction, with any number of contact points on the touchscreen.

As shown in various examples, a gesture can be received at a location on top the visual information itself, instead of being made on a user interface element dedicated to scrolling (e.g., a scroll bar).

Example 8

Exemplary Smooth Scrolling Movement

In any of the examples herein, smooth scrolling movement can be used to navigate through content. Smooth scrolling movement refers to movement of visual information by a displacement that is proportional to the gesture velocity of the gesture that initiated the movement, if the gesture velocity is within a particular velocity range. Gestures of different velocities within a velocity range associated with smooth scrolling movement cause different displacements. Typically, smooth scrolling movement is in a direction that corresponds to the direction of the gesture. For example, an upward gesture can cause upward smooth scrolling movement in the visual information, or a downward gesture can cause downward smooth scrolling movement in the visual information.

A velocity range for smooth scrolling movement can be, for example, a range between 0 and a positive number. A velocity range also can allow for negative gesture velocity values, such as where a negative gesture velocity is used to represent a gesture in the opposite direction of a gesture with a positive velocity. Where negative and positive gesture velocities are used, a velocity range for smooth scrolling movement can be, for example, a range between a negative gesture velocity value and a positive gesture velocity value.

Smooth scrolling movement can be used in combination with jump displacement movement and/or other types of movement. Smooth scrolling movement also can depend on an inertia model. Exemplary inertia models are described in further detail herein.

In any of the examples herein, smooth scrolling movement (e.g., scrolling speeds and the ways in which the movement is rendered) can be adjustable to suit user preferences, device characteristics (e.g., display characteristics), and the like. Although referred to herein as smooth scrolling movement, such movement need not be actually rendered or displayed smoothly to be considered smooth scrolling movement. For example, processing power limitations or other characteristics of a device may prevent smooth rendering.

Example 9

Exemplary Page-by-Page Movement

In any of the examples described herein, a jump displacement movement can be page-by-page movement. Page-by-page movement refers to movement of visual information by a displacement of a page when the gesture velocity of a gesture that initiated the movement falls within a particular velocity range.

A velocity range for page-by-page movement can be, for example, a range between two positive numbers, or a range that extends from a positive number to infinity. A velocity range also can allow for negative numbers, such as where a negative velocity is used to represent a gesture in the opposite direction of a gesture with a positive velocity. Page-by-page movement can be used in combination with smooth scrolling movement and/or other types of movement. For example, a continuous series of gestures can cause smooth scrolling movement, page-by-page movement, and/or other movement depending on the gestures, which can allow a user to flexibly navigate through content (e.g., page-by-page movement to reach a desired page, followed by smooth scrolling movement to reach a desired position on the desired page).

A page can be defined according to one or more dimensions of a viewport being used to view visual information. For example, if ten lines of text in an article on a web page will fit in a viewport at one time, then page-by-page movement can include a shift of the text such that the previous ten lines or the next ten lines of the article are displayed. As another example, page-by-page movement can include a shift of less than the amount if information that will fit in the viewport at one time (e.g., a shift of eight lines where ten lines will fit in the viewport), which can allow some overlap of the information that is visible before and after the page-by-page movement. Such overlap can help users keep track of their place in the content (e.g., by allowing part of a previous page to remain visible). A page can be measured in terms of one dimension (e.g., a vertical dimension in a vertically scrollable list) or multiple dimensions (e.g., in horizontal and vertical dimensions where horizontal and vertical scrolling are available). Alternatively, a page can be defined in some other way. For example, a page of visual information can be defined independently of the display area or viewport being used to view the visual information, as can be the case with an electronic book (e-book) being viewed in an e-book reader device or application. Page-by-page movement can cause visual information to move to the next page in a book, article or the like, regardless of the size of the viewport being used to view the content.

Described techniques and tools can use page displacements of any size or number of pages and/or gesture velocity ranges of any size, and can even use more than one page size, number of pages, and/or gesture velocity range in the same scrolling session. Although described as page-by-page movement, such movement need not be rendered as an abrupt transition from one page to another in a display area. For example, a page-by-page movement can have a predetermined displacement that is determined based on a velocity that falls within a particular velocity range, but for a more natural feel, the movement itself can be rendered as a gradual scrolling movement that ends at the predetermined displacement (e.g., at a page boundary).

Example 10

Exemplary Flexible Touch-Based Scrolling Feature

Figure 4:
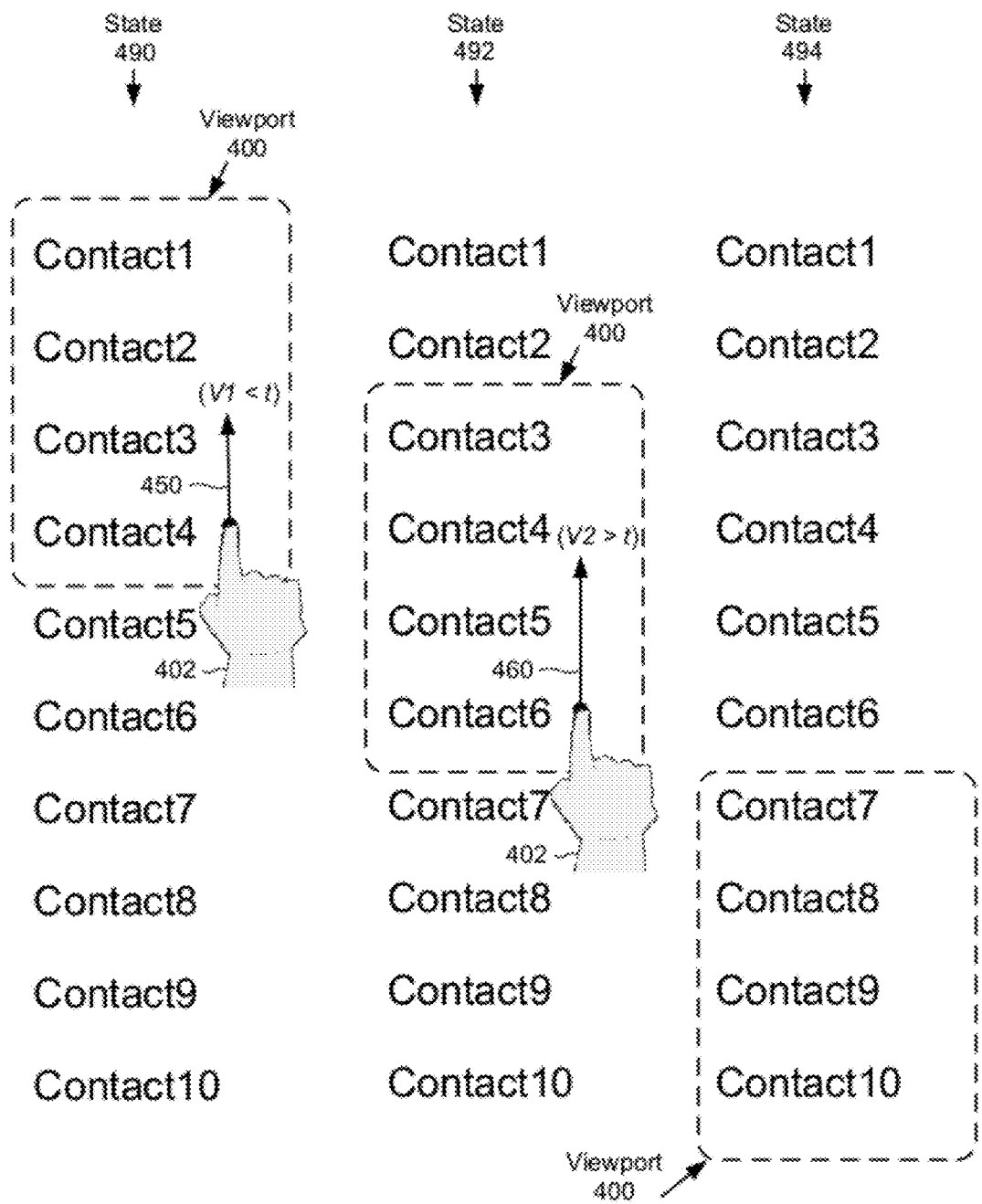
FIG. 4 is a diagram of exemplary flexible touch-based scrolling features.

FIG. 4 is a conceptual diagram of an exemplary flexible touch-based scrolling feature and can be implemented, for example, in a system such as that shown in FIG. 3. Any of the flexible touch-based scrolling features described herein can be implemented in computer-executable instructions stored in one or more computer-readable media (e.g., storage or other tangible media) or one or more computer-readable storage devices.

According to the example shown in FIG. 4, gesture velocities V1 and V2 are compared with a threshold velocity t to determine whether smooth scrolling movement or page-by-page movement should be used. In the example, a page is defined as an amount of visual information that can fit in the viewport 400 (e.g., four contacts in a contact list). A user 402 (represented by the hand icon) interacts with a list comprising list elements ("Contact1," "Contact2," etc.). FIG. 4 shows example states 490-494. In state 490, user 402 interacts with a touchscreen by making an upward gesture 450 having a velocity V1 that is less than t. In response, the visual information in the list moves up by less than a page in a smooth scrolling movement. In state 492, user 402 interacts with a touchscreen by making an upward gesture 460 having a velocity V2 that is greater than t. In response, the visual information in the list moves up by a page, as shown in state 494.

States 490-494 are only examples of possible states. In practice, the visual information shown in FIG. 4 can exist in any number of states (e.g., in intermediate states between example states 390-394, etc.) in addition to, or as alternatives to, the example states 490-494.

Although FIG. 4 shows user 402 making upward motions to scroll towards the end of a contact list, user 402 also can make other motions (e.g., downward motions to scroll towards the beginning of the list). For example, from state 494, user 402 can make a downward gesture (not shown) to move the list elements down and scroll towards the beginning of the list. Furthermore, although a contact list is shown for ease of illustration, other content also can be navigated using technologies described herein. For example, a user can interact with a web page comprising a block of text (e.g., in a news article). The text can move in response to gestures, such as by moving up by less than a page of text in a smooth scrolling movement, or moving up by a page of text in a page-by-page movement.

In any of the examples herein, as shown in FIG. 4, a gesture in a particular direction can cause scrolling in an opposite direction. For example, an upward gesture can cause scrolling in a downward direction (e.g., toward the end of the visual information).

Example 11

Exemplary Method of Applying a Combination of the Technologies

Figure 5:
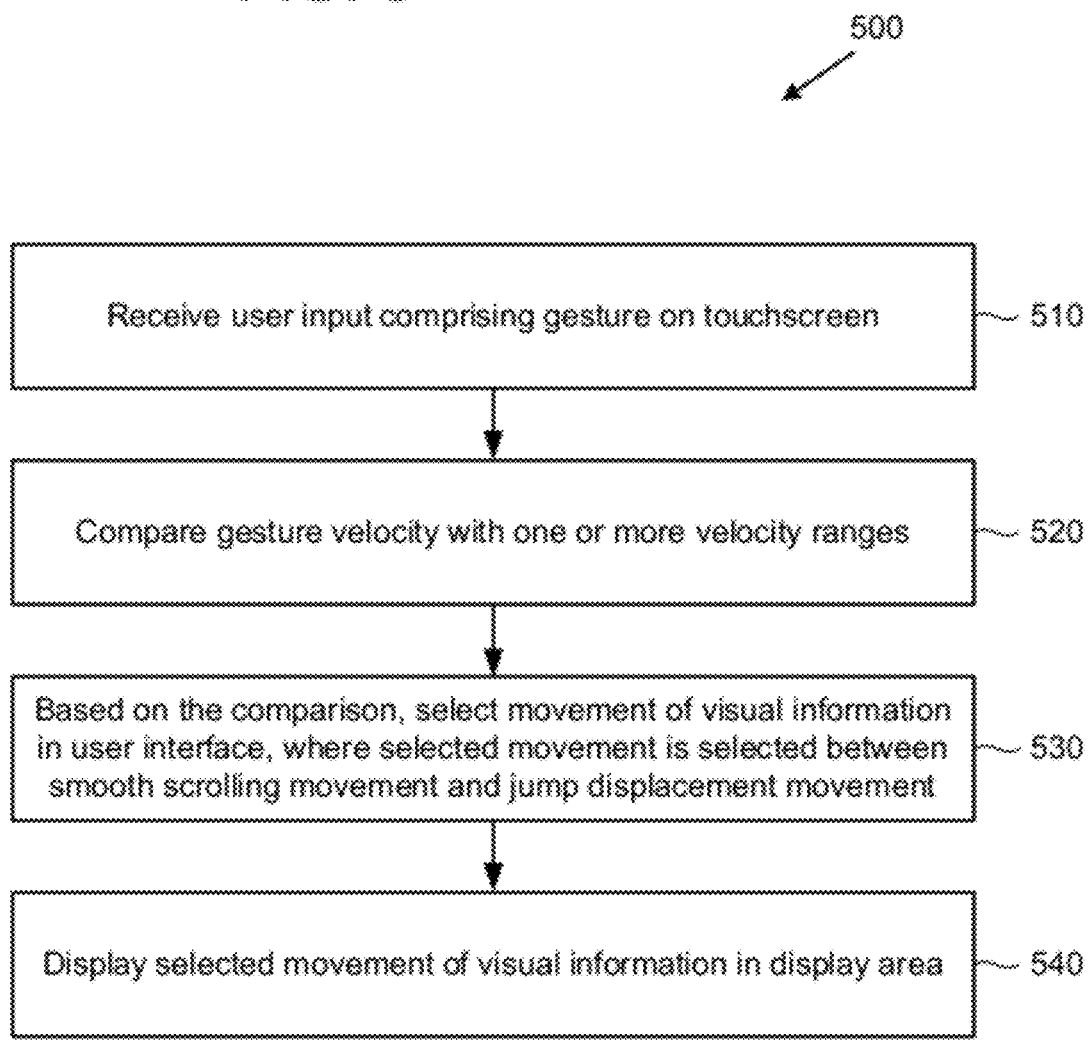
FIG. 5 is a flowchart of another exemplary method of implementing the flexible touch-based scrolling technologies described herein.

FIG. 5 is a flowchart of an exemplary method 500 of implementing flexible touch-based scrolling technologies described herein and can be implemented, for example, in a system such as that shown in FIG. 3.

At 510, the system receives user input comprising a gesture on a touchscreen. At 520, the system compares the velocity of the gesture with one or more velocity ranges. For example, the system determines whether the gesture velocity is above a threshold velocity or below a threshold velocity. At 530, the system selects between smooth scrolling movement and jump displacement movement of visual information in a user interface, based on the comparison. For example, the system selects smooth scrolling movement if the gesture velocity is below a threshold velocity, and the system selects jump displacement movement if the gesture velocity is above a threshold velocity. Any threshold velocity can be used. Gesture velocities that are equal to or substantially equal to a threshold velocity can be treated in different ways. For example, a gesture velocity that is equal to a threshold velocity can cause smooth scrolling movement or jump displacement movement, depending on implementation. At 540, the system displays the selected movement in a display area.

Example 12

Exemplary Beginning-or-End Movement

In any of the examples herein, beginning-or-end movement involves moving visual information from a current position to a position at the end or beginning of content (e.g., an article on a web page, a document, a list, etc.). Beginning-or-end movement is an example of jump displacement movement. In beginning-or-end movement, the jump displacement can be considered to be the difference between a current position and a position at the end or beginning of the visual information. Beginning-or-end movement can be used, for example, when a gesture velocity falls within a higher velocity range than a range associated with page-by-page movement. Beginning-or-end movement also can be used in place of page-by-page movement or other jump displacement movements, such as where a particular jump displacement would otherwise move visual information beyond an end boundary. A determination as to whether to move visual information to a beginning position or an end position can be made based on a direction of a gesture. For example, a gesture towards the top of an article on a web page can cause the text of the article to move up and therefore cause movement to the end of the article. The end positions and beginning positions used in beginning-or-end movement can vary. For example, a system can be configured such that, at an end position of vertically scrollable text, the last line of text appears at the top, the bottom, or somewhere near the middle of a viewport in a display area. As another example, a system can be configured such that, at a beginning position of vertically scrollable text, the first line of text appears at the top, the bottom, or somewhere near the middle of a viewport in a display area.

Example 13

Exemplary Method of Applying a Combination of the Technologies

Figure 6:
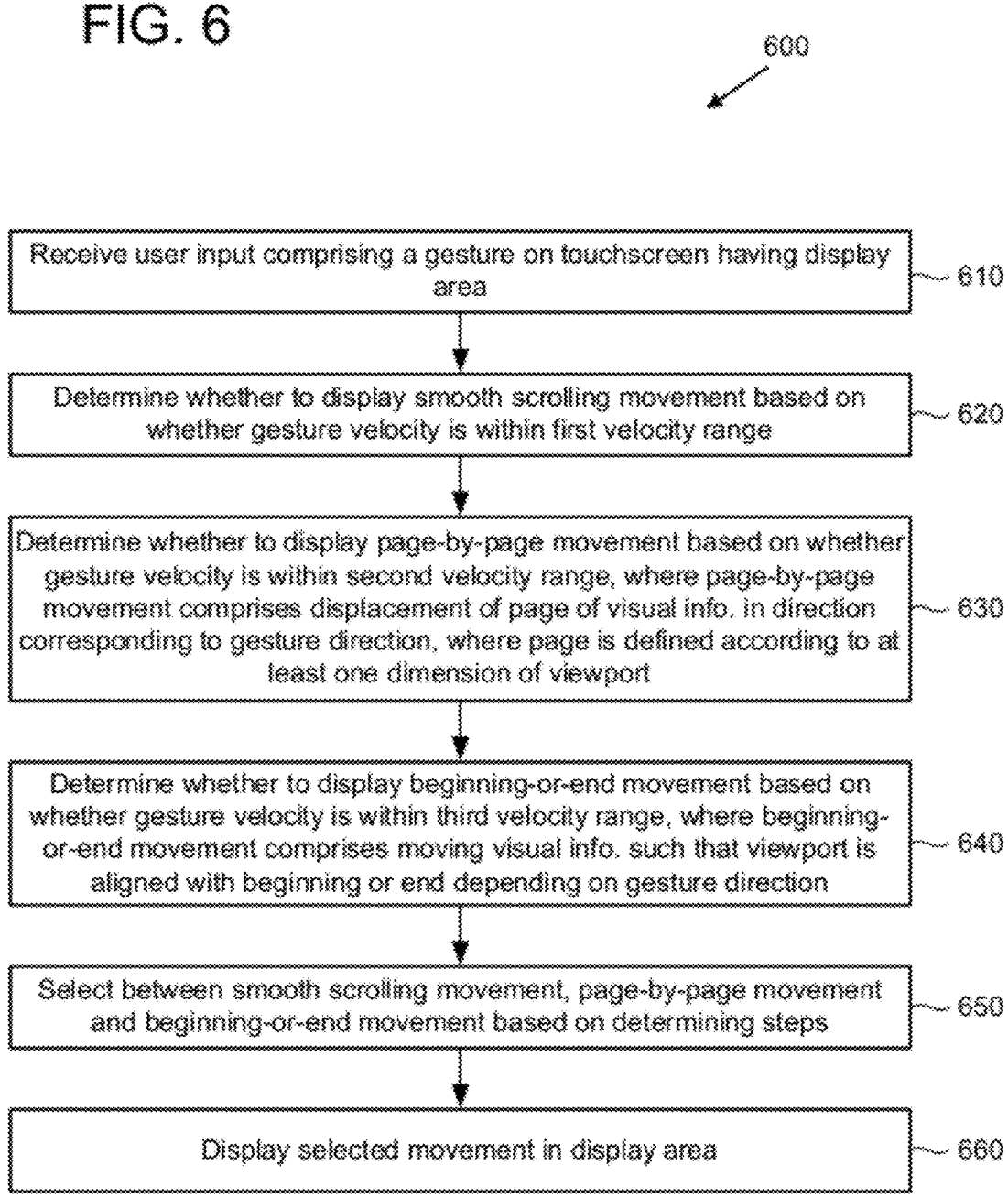
FIG. 6 is a flowchart of another exemplary method of implementing the flexible touch-based scrolling technologies described herein.

FIG. 6 is a flowchart of another exemplary method 600 of implementing flexible touch-based scrolling technologies described herein and can be implemented, for example, in a system such as that shown in FIG. 3.

At 610, the system receives user input comprising a gesture on a touchscreen having a display area. At 620, the system determines whether to display smooth scrolling movement based on whether the gesture velocity is within a first velocity range. For example, the system can compare the gesture velocity with a first threshold velocity and determine whether to display smooth scrolling movement based on whether the gesture velocity is less than the first threshold velocity. At 630, the system determines whether to display page-by-page movement based on whether the gesture velocity is within a second velocity range. For example, the system can compare the gesture velocity with the first threshold velocity and a second threshold velocity that is greater than the first threshold velocity, and determine whether to display page-by-page movement based on whether the gesture velocity is greater than the first threshold velocity and less than the second threshold velocity. Page-by-page movement comprises a displacement of the visual information equivalent to a page, in a direction corresponding to the direction of the gesture. In this example, a page is defined according to at least one dimension of a viewport. At 640, the system determines whether to display beginning-or-end movement based on whether the gesture velocity is within a third velocity range. For example, the system can compare the gesture velocity with the second threshold velocity and determine whether to display beginning-or-end movement based on whether the gesture velocity is greater than the second threshold velocity. Beginning-or-end movement comprises moving the visual information such that the viewport is aligned with beginning or end of the visual information, depending on the gesture direction. At 650, the system selects between smooth scrolling movement, page-by-page movement, or beginning-or-end movement based on the determining steps. At 660, the system renders the selected movement for display in the display area.

Example 14

Exemplary Transition Between Scrolling Events

The movement of the visual information when transitioning between scrolling events (e.g., page-by-page scrolling events) can be presented in different ways. For example, a flexible touch-based scrolling tool can animate the transition with a scrolling motion that ends at a page boundary. Or, the flexible touch-based scrolling can cause the visual information to jump directly to the appropriate page (e.g., the next page or previous page for one page jump) without scrolling during the transition. Such a jump can be combined with blending effects, fade-in/fade-out effects, or the like, for a smoother visual transition.

In any of the examples herein, transitions between scrolling events can be adjustable to suit user preferences, device characteristics (e.g., display characteristics), and the like.

Example 15

Exemplary Scrolling Speed

In any of the examples described herein, scrolling can proceed according to a scrolling speed. A scrolling speed can depend on system settings, gesture velocity, etc. Scrolling speeds can be adjustable. Described techniques and tools can scroll content at any scrolling speed, and can use any type of fine or coarse speed controls.

Example 16

Exemplary End Boundary

In any of the examples described herein, an end boundary indicates a stopping point for scrolling. An end boundary can be at any position in content. Typically, an end boundary marks a position at end of the content being viewed, or a particular part of content being viewed (e.g., content selected by a user, such as a text block on a web page). End boundaries can be visible or remain hidden during scrolling. End boundaries can be set by default (e.g., at the top or bottom of a vertically scrollable list, document, or web page), or selected by a user. When a content being scrolled reaches the end of its scroll range as indicated by an end boundary, scrolling can be disengaged without further user input, allowing the user to perform other tasks. Described techniques and tools can use end boundaries at any position in content, and can even use more than one end boundary on the same page. Typically, content will include at least one end boundary to prevent endless scrolling, but end boundaries are not required.

Example 17

Exemplary Viewable Web Page

In any of the examples herein, a viewable web page can include any collection of visual information (e.g., text, images, embedded video clips, animations, graphics, interactive information such as hyperlinks or user interface controls, etc.) that is viewable in a web browser. Although the techniques and tools described herein are designed to be used to assist in presenting visual information, the techniques and tools described herein can be used effectively with web pages that also include other kinds of information, such as information that is not intended to be presented to a user (e.g., scripts, metadata, style information) or information that is not visual (e.g., audio information).

The viewable web page typically results from compilation of source code such as markup language source code (e.g., HTML, XHTML, DHTML, XML). However, web page source code also may include other types of source code such as scripting language source code (e.g., Javascript) or other source code. The technologies described herein can be implemented to work with any such source code.

Example 18

Exemplary Inertia Model

In any of the examples herein, movements can be based on user input (e.g., gestures on a touchscreen) and an inertia model. For example, a movement such as a smooth scrolling movement can be extended by applying simulated inertia, to provide a more natural feel for the movement. Applying inertia to a movement typically involves performing one more calculations using gesture information (e.g., a gesture start position, a gesture end position, gesture velocity and/or other information) to determine a new position for the content being moved. Inertia calculations also can involve one or more inertia motion values (e.g., friction coefficients).

A determination as to whether inertia should be applied to a particular movement can depend on the gesture that initiated the movement. For example, a touch-based UI system can distinguish between a non-inertia gesture and an inertia gesture by determining how quickly the user's finger, stylus, etc., was moving when it broke contact with the touchscreen, and whether the velocity exceeds an inertia movement threshold. If the gesture ends with a velocity above the inertia movement threshold, the gesture can be interpreted as an inertia gesture. (Such inertia movement thresholds need not be the same as velocity thresholds used to determine whether smooth scrolling movement, page-by-page movement, or other movements will be displayed.) For example, a gesture that starts with a drag motion at a velocity below an inertia movement threshold and ends with a velocity above the inertia movement threshold can be interpreted as ending with a flick that causes movement to which inertia can be applied. If the gesture ends with a velocity below the inertia movement threshold, the gesture can be interpreted as a non-inertia gesture.

In an inertia movement, when the user finishes a gesture (e.g., by lifting a finger or other object to end the interaction with the touchscreen), a velocity and direction for that movement is identified, and the content initially continues in the same direction and speed as the gesture, as if the content was a real, physical object with a non-zero mass. If the motion is not stopped for some other, permissible reason (e.g., where the UI element reaches a boundary or is stopped by another user gesture), the motion gradually decelerates over time, eventually coming to a stop. The deceleration can proceed according to a combination of equations and coefficients (e.g., friction coefficients), which can vary depending on implementation. Default system-wide coefficient values can be made available. Default system-wide coefficients can help to maintain a consistent feeling across all controls. Alternatively, different equations or coefficients can be used, such as where a particular application or control has its own friction coefficient for modeling different kinds of motion.

Described techniques and tools can use any kind of inertia model for inertia movement, or inertia movement can be omitted.

Example 19

Exemplary User Interface for Parameter Control

Figure 7:
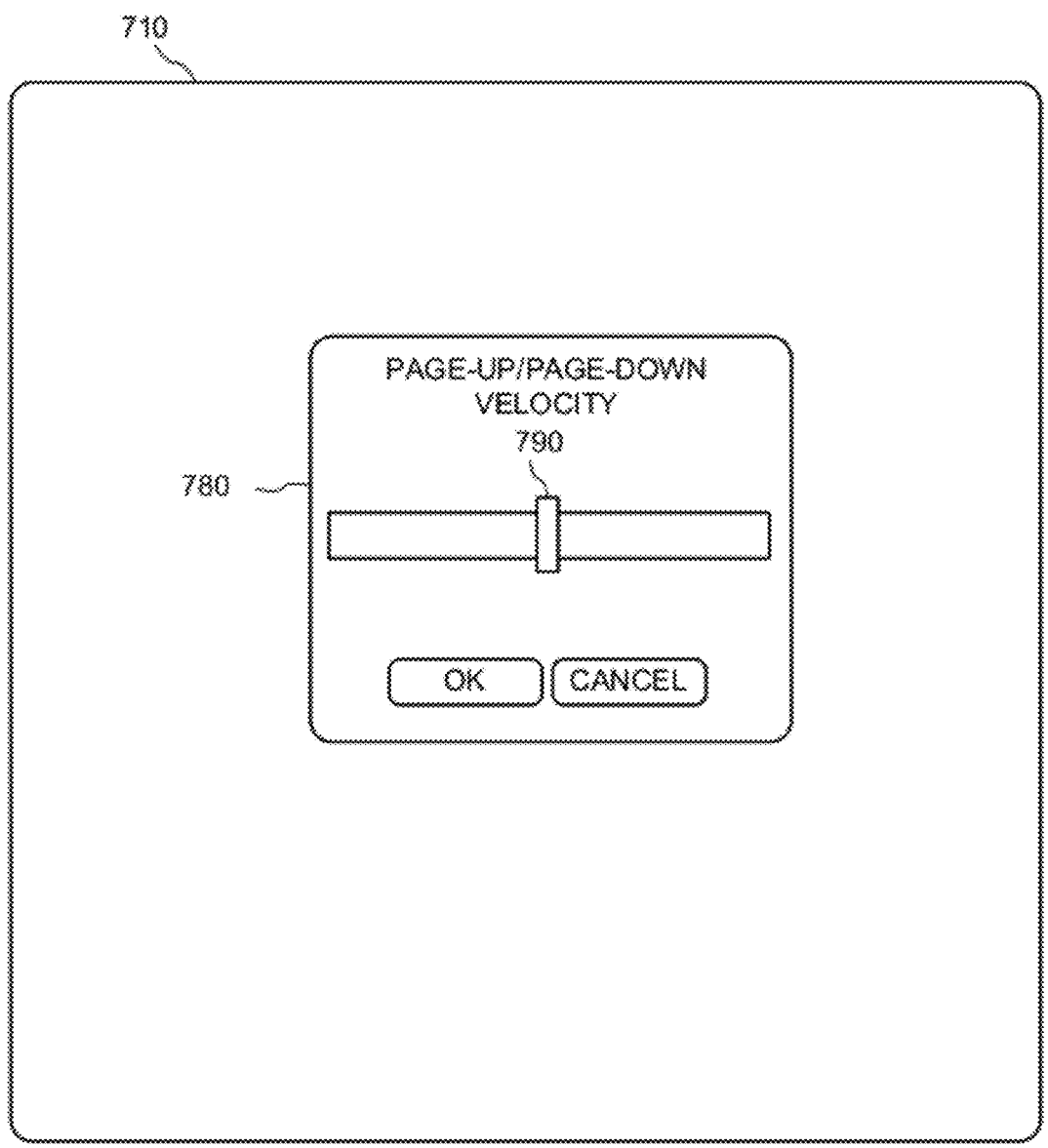
FIG. 7 is a diagram of an exemplary user interface accepting input of additional information related to flexible touch-based scrolling technologies described herein.

FIG. 7 is a diagram of an exemplary user interface 710 accepting input of additional information related to flexible touch-based scrolling technologies described herein. In the example, a user has selected a threshold velocity by adjusting a slider control 790 in box 780. The threshold velocity can be used to determine whether a gesture having a particular gesture velocity will cause page-by-page movement or smooth scrolling movement of visual information. The user interface 710 responds by accepting additional information (e.g., via the box 780) about flexible touch-based scrolling from the user.

Additional information that can be provided by a user via user interface 710 can include displacement amounts for jump displacement movement (e.g., one page, two pages, less than a page, a line of text, etc.), gesture sensitivity controls, inertia movement controls, another threshold velocity (e.g., for beginning-or-end movements) or the like.

Example 20

Exemplary Display Area

In any of the examples herein, movements can be rendered for display in a display area. A display area can be any area of a device that is configured to display visual information. Display areas can include, for example, display areas of touchscreens, which combine input and output functionality, or display areas of displays that are used for output only, such as desktop computer or laptop computer displays without touch input functionality. Described techniques and tools can be used with display areas of any size, shape or configuration.

Example 21

Exemplary Touchscreen

In any of the examples herein, a touchscreen can be used for user input. Touchscreens can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens. The act of contacting (or, where physical contact is not necessary, coming into close enough proximity to the touchscreen) a touchscreen in some way to generate user input can be referred to as a gesture. Described techniques and tools can be used with touchscreens of any size, shape or configuration.

Example 22

Exemplary Viewport

In any of the examples herein, a viewport is an element in which content is displayed in a display area. In some cases, such as when a web browser or other content viewer is in a full-screen mode, an entire display area can be occupied by a viewport. In other cases, a viewport occupies only a portion of a display area and shares the display area with other elements, such as graphical elements (e.g., borders, backgrounds) and/or functional elements (e.g., scroll bars, control buttons, etc.). Display areas can include more than one viewport. For example, multiple viewports can be used in the same display area to view multiple collections of content (e.g., different web pages, different documents, etc.). Viewports can occupy static positions in a display area, or viewports can be moveable (e.g., moveable by a user). The size, shape and orientation of viewports can be static or changeable (e.g., adjustable by a user). For example, viewports can be in a landscape or portrait orientation, and the orientation can be changed in response to events such as rotation of a device. Described techniques and tools can be used with viewports of any size, shape or configuration.

Example 23

Exemplary User Input

In any of the examples herein, a user can interact with a device to control display of visual information via different kinds of user input. For example, a user can access flexible touch-based scrolling features by interacting with a touchscreen. Alternatively, or in combination with touchscreen input, a user can control display of visual information in some other way, such as by pressing buttons (e.g., directional buttons) on a keypad or keyboard, moving a trackball, pointing and clicking with a mouse, making a voice command, etc. The technologies described herein can be implemented to work with any such user input.

Example 24

Exemplary Computing Environment

Figure 8:
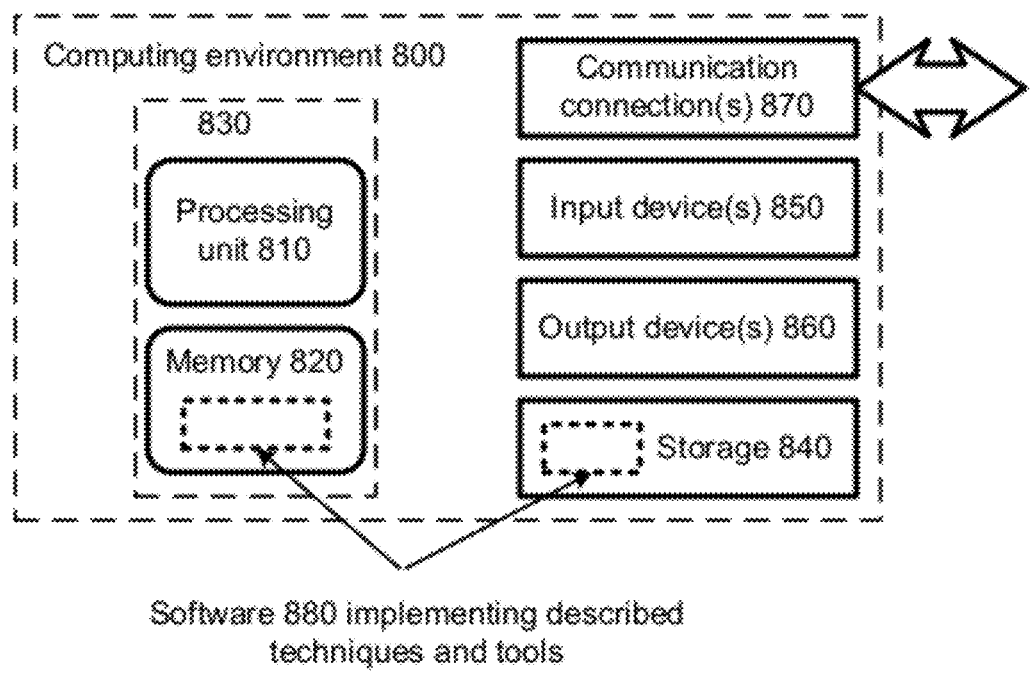
FIG. 8 is a block diagram of an exemplary computing environment suitable for implementing any of the technologies described herein.

FIG. 8 illustrates a generalized example of a suitable computing environment 800 in which the described technologies can be implemented. The computing environment 800 is not intended to suggest any limitation as to scope of use or functionality, as the technologies may be implemented in diverse general-purpose or special-purpose computing environments.

With reference to FIG. 8, the computing environment 800 includes at least one processing unit 810 coupled to memory 820. In FIG. 8, this basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 can store software 880 implementing any of the technologies described herein.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other computer-readable media which can be used to store information and which can be accessed within the computing environment 800. The storage 840 can store software 880 containing instructions for any of the technologies described herein.

The input device(s) 850 may be a touch input device such as a keyboard, mouse, pen, or trackball, a voice input device, a scanning device, or another device that provides input to the computing environment 800. For audio, the input device(s) 850 may be a sound card or similar device that accepts audio input in analog or digital form, or a CD-ROM reader that provides audio samples to the computing environment. The output device(s) 860 may be a display, printer, speaker, CD-writer, or another device that provides output from the computing environment 800. Some input/output devices, such as a touchscreen, may include both input and output functionality.

The communication connection(s) 870 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Example 25

Exemplary Implementation Environment

Figure 9:
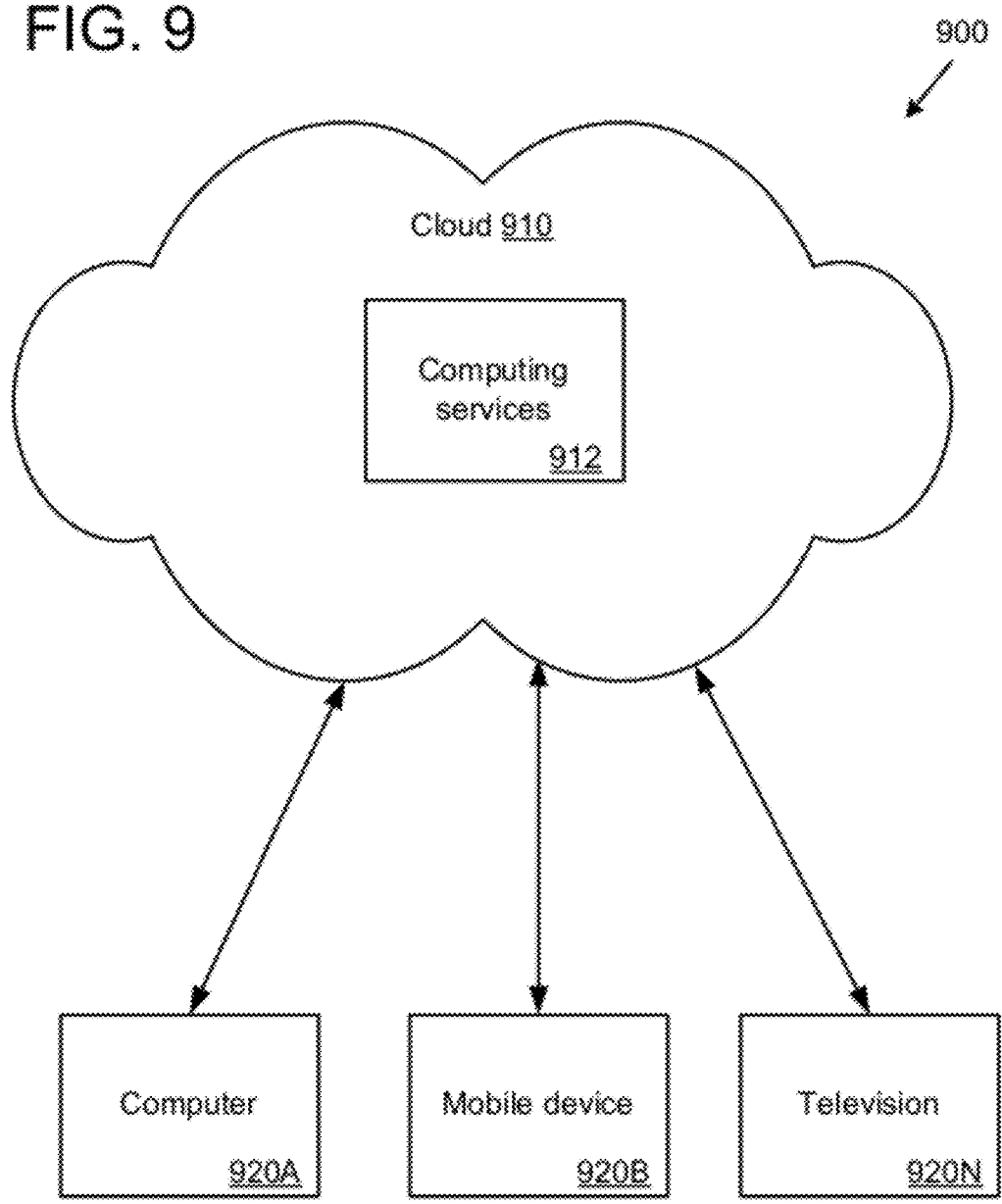
FIG. 9 is a block diagram of an exemplary cloud computing arrangement suitable for implementing any of the technologies described herein.

FIG. 9 illustrates a generalized example of a suitable implementation environment 900 in which described embodiments, techniques, and technologies may be implemented.

In example environment 900, various types of services (e.g., computing services 912) are provided by a cloud 910. For example, the cloud 910 can comprise a collection of computing devices, which may be located centrally or distributed, that provide cloud-based services to various types of users and devices connected via a network such as the Internet. The cloud computing environment 900 can be used in different ways to accomplish computing tasks. For example, with reference to described techniques and tools, some tasks, such as processing user input and presenting a user interface, can be performed on a local computing device, while other tasks, such as storage of data to be used in subsequent processing, can be performed elsewhere in the cloud.

In example environment 900, the cloud 910 provides services for connected devices with a variety of screen capabilities 920A-N. Connected device 920A represents a device with a mid-sized screen. For example, connected device 920A could be a personal computer such as desktop computer, laptop, notebook, netbook, or the like. Connected device 920B represents a device with a small-sized screen. For example, connected device 920B could be a mobile phone, smart phone, personal digital assistant, tablet computer, and the like. Connected device 920N represents a device with a large screen. For example, connected device 920N could be a television (e.g., a smart television) or another device connected to a television or projector screen (e.g., a set-top box or gaming console).

A variety of services can be provided by the cloud 910 through one or more service providers (not shown). For example, the cloud 910 can provide services related to mobile computing to one or more of the various connected devices 920A-N. Cloud services can be customized to the screen size, display capability, or other functionality of the particular connected device (e.g., connected devices 920A-N). For example, cloud services can be customized for mobile devices by taking into account the screen size, input devices, and communication bandwidth limitations typically associated with mobile devices.

Example 26

Exemplary Mobile Device

Figure 10:
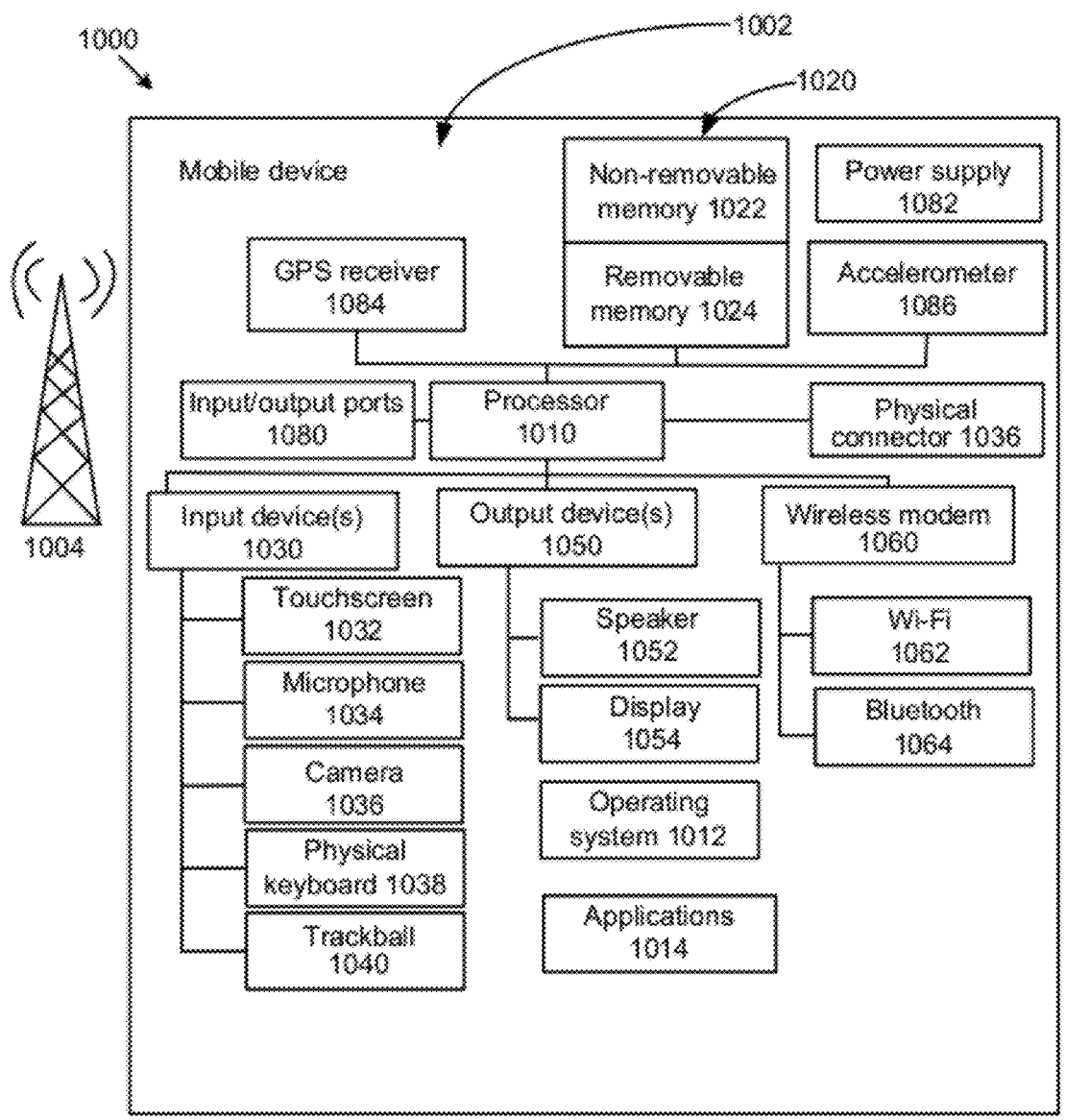
FIG. 10 is a block diagram of an exemplary mobile device suitable for implementing any of the technologies described herein.

FIG. 10 is a system diagram depicting an exemplary mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1004, such as a cellular or satellite network.

The illustrated mobile device can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs can include common mobile computing applications (e.g., include email applications. calendars, contact managers, web browsers, messaging applications), or any other computing application.

The illustrated mobile device can include memory 1020. Memory 1020 can include non-removable memory 1022 and/or removable memory 1024. The non-removable memory 1022 can include RAM, ROM, flash memory, a disk drive, or other well-known memory storage technologies. The removable memory 1024 can include flash memory or a Subscriber Identity Module (SIM) card, which is well known in GSM communication systems, or other well-known memory storage technologies, such as smart cards. The memory 1020 can be used for storing data and/or code for running the operating system 1012 and the applications 1014. Example data can include web pages, text, images, sound files, video data, or other data sets to be sent to and/or received from one or more network servers or other mobile devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1030, such as a touchscreen 1032, microphone 1034, camera 1036, physical keyboard 1038 and/or trackball 1040 and one or more output devices 1050, such as a speaker 1052 and a display 1054. Other possible output devices (not shown) can include a piezoelectric or other haptic output device. Some devices can serve more than one input/output function. For example, touchscreen 1032 and display 1054 can be combined in a single input/output device.

Touchscreen 1032 can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth or Wi-Fi). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a global positioning system (GPS) receiver, an accelerometer 1086, a transceiver 1088 (for wirelessly transmitting analog or digital signals) and/or a physical connector 1090, which can be a USB port, IEEE 1394 (FireWire) port, and/or RS-232 port. The illustrated components 1002 are not required or all-inclusive, as components can be deleted and other components can be added.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, CD-ROM, CD-RW, DVD, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of these claims.

We claim:

1. A computer-implemented method, comprising:
   storing at least two predetermined values, the predetermined values comprising at least two threshold velocities defining a jump displacement velocity range;
   receiving first user input comprising a gesture on a touchscreen, the gesture having a gesture velocity;
   comparing the gesture velocity with the at least two threshold velocities, wherein possible gesture velocities of received user inputs fall within either a smooth scrolling velocity range or the jump displacement velocity range;
   upon determining that the gesture velocity falls within the jump displacement velocity range, selecting jump displacement movement of visual information in a user interface, wherein the visual information comprises multiple pages, and wherein the jump displacement movement advances a currently displayed page to a next page in a direction of the gesture; and
   rendering the jump displacement movement of the visual information for display.

2. One or more computer-readable storage devices having encoded thereon computer-executable instructions operable to cause a computer to perform the method of claim 1.

3. The method of claim 1, further comprising displaying the rendered jump displacement movement in a display area.

4. The method of claim 3, wherein the display area comprises a display area of the touchscreen.

5. The method of claim 1, wherein the gesture comprises a flick gesture.

6. The method of claim 1, wherein the comparing comprises determining that the gesture velocity exceeds one of the at least two threshold velocities separating the smooth scrolling velocity range from the jump displacement range.

7. The method of claim 1, wherein a portion of the visual information included in the currently displayed page is also included in the next page.

8. A computing device, comprising:
   a memory storing a smooth scrolling velocity range and a jump displacement velocity range, the jump displacement velocity range bound by at least two threshold velocities;
   a touchscreen sensor operable to receive first user input comprising a gesture on the touchscreen, the gesture having a gesture velocity;
   a processor operable to:
      perform a comparison by comparing the gesture velocity with one of the smooth scrolling velocity range and the jump displacement velocity range, wherein possible gesture velocities of received user inputs fall within either the smooth scrolling velocity range or the jump displacement velocity range; and
      based on the comparing, select a first selected movement of visual information in a user interface, wherein the first selected movement is selected between smooth scrolling movement and jump displacement movement, wherein the visual information comprises multiple pages, and wherein the jump displacement movement advances a currently displayed page to a next page in a direction of the gesture and by an amount of data that fits within a viewport of the touchscreen; and
   a screen operable to display the first selected movement of the visual information in the display area.

9. The computing device of claim 8, wherein the comparing comprises comparing the gesture velocity with a threshold velocity separating the smooth scrolling velocity range from the jump displacement range.

10. The computing device of claim 9, wherein the comparing comprises determining that the gesture velocity exceeds the threshold velocity, and wherein the first selected movement comprises the jump displacement movement.

11. The computing device of claim 10, wherein the jump displacement movement comprises movement of the visual information by a displacement equivalent to a page of the visual information.

12. The computing device of claim 11, wherein one or more dimensions of the page are based on one or more dimensions of a viewport in the display area.

13. The computing device of claim 9, wherein during the comparing, the processor is further operable to determine that the gesture velocity is less than the threshold velocity, and wherein the first selected movement comprises the smooth scrolling movement.

14. The computing device of claim 13, wherein the smooth scrolling movement comprises moving the visual information at a scrolling speed proportional to the gesture velocity.

15. The computing device of claim 14, wherein the processor is further operable to apply inertia movement to the smooth scrolling movement.

16. The computing device of claim 14, wherein:
   the touchscreen sensor is further operable to receive a second user input comprising a second gesture on the touchscreen, the second gesture having a second gesture velocity;
   the processor is further operable to:
      compare the second gesture velocity with at least one of the smooth scrolling velocity range or the jump displacement velocity range; and
      based on the comparing, select a second selected movement of the visual information in the user interface, wherein the second selected movement is selected between the smooth scrolling movement and the jump displacement movement and the second selected movement differs from the first selected movement; and the screen further operable to display the second selected movement of the visual information in the display area.

17. The computing device of claim 16, wherein the first selected movement is the smooth scrolling movement, and wherein the second selected movement is the jump displacement movement.

18. The computing device of claim 16, wherein the first selected movement is the jump displacement movement, and wherein the second selected movement is the smooth scrolling movement.

19. One or more computer-readable memory having encoded thereon computer-executable instructions causing a computer to perform a method, the stored instructions comprising:

instructions to receive user input comprising a gesture on a touchscreen having a display area, the gesture having a gesture velocity and a gesture direction;

instructions to determine whether to display smooth scrolling movement of visual information in a user interface in the display area based on whether the gesture velocity is within a first velocity range;

instructions to determine whether to display page-by-page movement of the visual information in the user interface based on whether the gesture velocity is within a second velocity range, the page-by-page movement comprising a displacement of a visual information equivalent to a page of the visual information in a direction that corresponds to the gesture direction, wherein the page is defined according to at least one dimension of a viewport in the user interface;

instructions to determine whether to display beginning-or-end movement of the visual information in the user interface based on whether the gesture velocity associated with the received user input is within a third velocity range, the beginning-or-end movement comprising moving the visual information such that the viewport is aligned with a beginning of the visual information or an end of the visual information depending on the gesture direction, wherein possible gesture velocities of received user inputs fall within either the first velocity range, the second velocity range, or the third velocity range, wherein the first, second and third velocity ranges are non-overlapping;

instructions to select between the smooth scrolling movement, the page-by-page movement and the beginning-or-end movement based on at least one of the determining steps; and instructions to render the selected movement for display in the display area.

20. A computing device, comprising:
one or more processors;
a touchscreen having a display area; and
one or more computer readable storage media having stored therein computer-executable instructions, the stored instructions comprising:

instructions to receive first user input comprising a gesture on the touchscreen, the gesture having a gesture velocity;

instructions to perform a single comparison by comparing the gesture velocity with one of a smooth scrolling velocity range or a jump displacement velocity range, wherein possible gesture velocities of received user inputs fall within either the smooth scrolling velocity range or the jump displacement velocity range;

instructions to select, based on the comparison, a first selected movement of visual information in a user interface, wherein the first selected movement is selected between smooth scrolling movement and jump displacement movement, wherein the visual information comprises multiple pages, and wherein the jump displacement movement advances a currently displayed page to a next page in a direction of the gesture; and instructions to display the first selected movement of the visual information in the display area;

wherein the instructions to perform a single comparison comprise:

instructions to compare the gesture velocity with a threshold velocity separating the smooth scrolling velocity range from the jump displacement range; and instructions to determine that the gesture velocity exceeds the threshold velocity, and wherein the first selected movement comprises the jump displacement movement;

wherein the jump displacement movement comprises movement of the visual information by a displacement equivalent to a page of the visual information;

wherein one or more dimensions of the page are based on one or more dimensions of a viewport in the display area;

wherein the visual information comprises a contact list, wherein the page comprises a number of contacts that can be displayed within the dimensions of the viewport, and wherein the jump displacement movement comprises shifting the contact list by a number of contacts equal to the number of contacts that fits within the viewport.

* * * * *